United States Patent
Knight (10) Patent No.: US 8,949,637 B2
(45) Date of Patent: Feb. 3, 2015

(54) OBTAINING POWER PROFILE INFORMATION WITH LOW OVERHEAD

(75) Inventor: Robert Knight, Mahomet, IL (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 13/070,700

(22) Filed: Mar. 24, 2011

(65) Prior Publication Data

US 2012/0246506 A1     Sep. 27, 2012

(51) Int. Cl.
*G06F 1/00* (2006.01)
*G06F 1/32* (2006.01)

(52) U.S. Cl.
CPC ............ *G06F 1/3206* (2013.01); *G06F 1/3287* (2013.01); *Y02B 60/32* (2013.01)
USPC ........................................ 713/320

(58) Field of Classification Search
CPC ........................................... G06F 1/32
USPC ........................................ 713/320
See application file for complete search history.

(56) References Cited

U.S. PATENT DOCUMENTS

| | | | |
|---|---|---|---|
| 6,792,392 B1 * | 9/2004 | Knight ........................ | 702/186 |
| 7,644,293 B2 | 1/2010 | Sistla et al. | |
| 7,903,116 B1 | 3/2011 | Klock et al. | |
| 2006/0069938 A1 | 3/2006 | Olszewski et al. | |
| 2007/0033425 A1 | 2/2007 | Clark | |
| 2007/0079294 A1 * | 4/2007 | Knight et al. .................. | 717/130 |
| 2007/0150759 A1 | 6/2007 | Srinivasan et al. | |
| 2007/0214342 A1 | 9/2007 | Newburn | |
| 2008/0104425 A1 | 5/2008 | Gunther et al. | |
| 2008/0162972 A1 | 7/2008 | Liu et al. | |
| 2009/0007108 A1 | 1/2009 | Hanebutte | |
| 2009/0150695 A1 | 6/2009 | Song et al. | |
| 2009/0172375 A1 | 7/2009 | Rotem et al. | |
| 2010/0031075 A1 * | 2/2010 | Kapil ............................ | 713/340 |
| 2011/0087900 A1 | 4/2011 | Lakhanpal et al. | |
| 2011/0106282 A1 | 5/2011 | Craig et al. | |

FOREIGN PATENT DOCUMENTS

JP      2007249961 A    9/2007

OTHER PUBLICATIONS

SunSoft, x86 Assembly Language Reference Manual, 1995, Sun Microsystems.*
U.S. Appl. No. 12/644,989, entitled, "Controlling Time Stamp Counter (TSC) Offsets for Mulitple Cores and Threads," filed Dec. 22, 2009, by Martin G. Dixon, et al.

(Continued)

*Primary Examiner* — Mohammed Rehman
*Assistant Examiner* — Austin Hicks
(74) *Attorney, Agent, or Firm* — Trop, Pruner & Hu, P.C.

(57) ABSTRACT

In one embodiment, a method includes, upon occurrence of multiple power state transition events for a core of a multi-core processor, reading a value of a system counter of the core and values of low power counters of the core, without expiration of a timer or triggering of an interrupt. These values can be stored in a storage of the processor. Then, after collection is completed, the storage can be accessed to determine a power profile of the processor using the stored values. Other embodiments are described and claimed.

19 Claims, 7 Drawing Sheets

(56) References Cited

OTHER PUBLICATIONS

International Searching Authority, "Notification of Transmittal of the International Search Report and the Written Opinion of the International Searching Authority," mailed Dec. 10, 2012, in International application No. PCT/US2011/068006.

Korean Patent Office, Office Action Mailed Aug. 28, 2014, In Korean Application No. 10-2013-7025178.

Search Report and the Written Opinion of the European Search Report, mailed Oct. 31, 2014, in European application No. 11861863.6.

\* cited by examiner

OBTAINING POWER PROFILE INFORMATION WITH LOW OVERHEAD

BACKGROUND

Modern computer systems include many different components coupled together to perform data processing, access information, and many other familiar tasks. Even when operating however, many components or portions thereof may not be needed to perform useful work. Oftentimes, these components can be placed into a low power state to reduce power consumption. These components, also referred to as devices, could be a specific chip, a processor, or any other hardware entity that consumes power. Also, a single chip such as a processor or a system-on-a-chip (SoC) can controllably place one or more of its components into a low power state.

To aid in analysis of power consumption, a power profile, which is a timeline of a device's power state, can be determined. In many systems, to determine a device's power state, a processor must be in a non-low power state to perform instructions or other operations to obtain the power profile information. That is, profiling applications that execute on a system being profiled operate by scheduling an event (e.g., an interrupt or a timer). When the event occurs, the operating system calls the application to collect the information necessary to describe the behavior it is profiling. However, by forcing a processor to be in a fully powered state to obtain this information, the goal of reducing power consumption is defeated. That is, this periodic collection of power information about a platform causes additional power to be used, and furthermore distorts the power behavior of the platform.

DETAILED DESCRIPTION

In various embodiments, power profiling can be performed without causing a processor or other device to unnecessarily exit a low power state. In this way, power profiling information can be determined with reduced power consumption (e.g., by not using a processor in a low power or sleep state to collect power profile information). Thus embodiments provide a method that enables power profiling on a platform without causing a processor to exit a low power or sleep state, while allowing a user to very accurately profile the platform. In many embodiments, events used to track power state transitions and hardware power instrumentation functionality can be combined to enable a power profiling application to very accurately profile a platform's power usage. Although exemplary embodiments are described herein with regard to processors understand the scope of the present invention is not limited in this regard, and power profiling can also be applied to other components of a system such as a system-on-a-chip (SoC) or so forth. Specifically, a SoC can include a system control unit (SCU) which is a small processor that is always on and manages the entire SoC's power. Some embodiments may execute a power profiler from this processor and be able to monitor any component of a platform.

Processor power state transition events track when a processor changes its current power state. Such power state transition events include active-to-sleep and sleep-to-active transitions. Note that as used herein, the terms "sleep state" and "low power state" may be used interchangeably to refer to a power state of a device that is less than a normal operating state. In such low power states, e.g., with reference to a processor, some components may remain powered on and functioning while other components are in a powered off state. Power is conserved when a processor enters a low power state. The processor may be programmed to enter a low power state or may autonomously enter a low power state when the processor detects that the executing workload does not need its support. That is, in some embodiments such events may be triggered by software (e.g., an operating system (OS)) or hardware (e.g., the processor itself). In various embodiments, upon occurrence of a transition event, a profiling application or other profiler may be notified.

An example of a processor power state transition event exists in the Linux™ operating system, namely a power_start tracepoint (also referred to as a C-state entry tracepoint). The C-state entry tracepoint is executed when the operating system is preparing to program the processor to enter into a sleep state. These tracepoints are kernel instrumentation mechanisms, and may be placed at points in the kernel source code flow to enable developers to understand the kernel's functionality better. In other words, a tracepoint is like a printf function call in the kernel source code.

Tracepoints provide functionality that allows a device driver to be dynamically connected to the tracepoint. When a device driver is connected to (e.g., registered with) a tracepoint, the operating system calls a function in the device driver when the kernel source code including the tracepoint is executed. In other words, the C-state entry tracepoint can be used to notify a power profiling application when the processor is preparing to enter a sleep state. Note that while described with respect to an implementation for a Linux™ OS, understand that the scope of the present invention is not limited in this regard, and embodiments can be used with other OSs. That is, more generally, embodiments provide for collection of certain power state information at a power state transition, e.g., as implemented by an OS.

When a processor enters certain low power states, it normally stops operating. In other words, it no longer executes instructions. When a processor is programmed to enter a low power state, it may chose to deviate from the sleep state requested. In other words, the operating system may program the hardware to enter sleep state 1 while the hardware may choose to enter sleep state 2 based on its knowledge of current platform activity. Representative processors include those based on an Intel™ instruction set architecture (ISA), and which may provide for a number of low power states, e.g., in accordance with the Advanced Configuration and Power Interface (ACPI) standard, e.g., Rev. 3.0b (published Oct. 10, 2006), which provides for multiple low power or so-called C-states with respect to a processor core.

In some embodiments, a processor may provide hardware support with regard to power profiling information. For example, in a multi-core processor each core may include low power state residency counters (e.g. C-state residency counters). The low power state residency counters are monotonically increasing counters that count (e.g., processor cycles) when the hardware is in a specific low power state. For example, a processor can provide C-state residency counters for only certain specified low power states, e.g., C-states C3 and C6. This hardware monitoring instrumentation allows for accurate monitoring of the hardware's low power behavior. Also, hardware may provide a system time counter. For example, a processor may provide, on a per core basis, a time stamp counter (TSC). In some embodiments, these counters are monotonically increasing counters that count at all times: when the hardware is active or in a low power state.

As discussed above, conventional profiling applications schedule an event (e.g., an interrupt or a timer) so that the profiling application can collect certain information. However, this is exactly the behavior in which power profiling software can cause a processor in a sleep state to exit its sleep state. When a processor exits a sleep state, it continues operating in its normal power consumption mode. In other words, a conventional profiling application that schedules events causes additional power to be consumed by the platform (and can distort low power performance information) as compared to a platform where an application profiler is not executing. Since embodiments use processor power state transition events as trigger events to collect power information about the platform, timers or interrupts are avoided and embodiments only obtain data when the processor is actively executing. In this way, the profiling application minimizes the power used to profile a platform and avoids distortion of the platform low power behavior.

In one embodiment, a device driver can be used to collect power profile information; however in other embodiments other privileged level software or even user level software can obtain the information. The device driver uses a processor power state transition event to be notified when the processor is preparing to enter a low power state. In this implementation, the device driver registers a function, e.g., a collection function, with an OS's power state transition code. For example, in one embodiment this code may be a Linux™ C-state entry tracepoint, and the registration causes the C-state entry tracepoint to call the registered function every time the operating system decides to place a processor into a sleep state.

When the OS executes its C-state entry tracepoint, the device driver collection function reads, in one embodiment, the system clock and the processor's sleep state residency counters and the accessed information is saved. For example, a first collection may occur at a first C-state entry tracepoint to obtain a sample A. The next time the C-state entry tracepoint executes, the device driver's function collects the same information for sample B. This operation continues during the collection of data. The performance cost can be minimal because only a handful of registers are read during a single C-state entry tracepoint.

Figure 1:
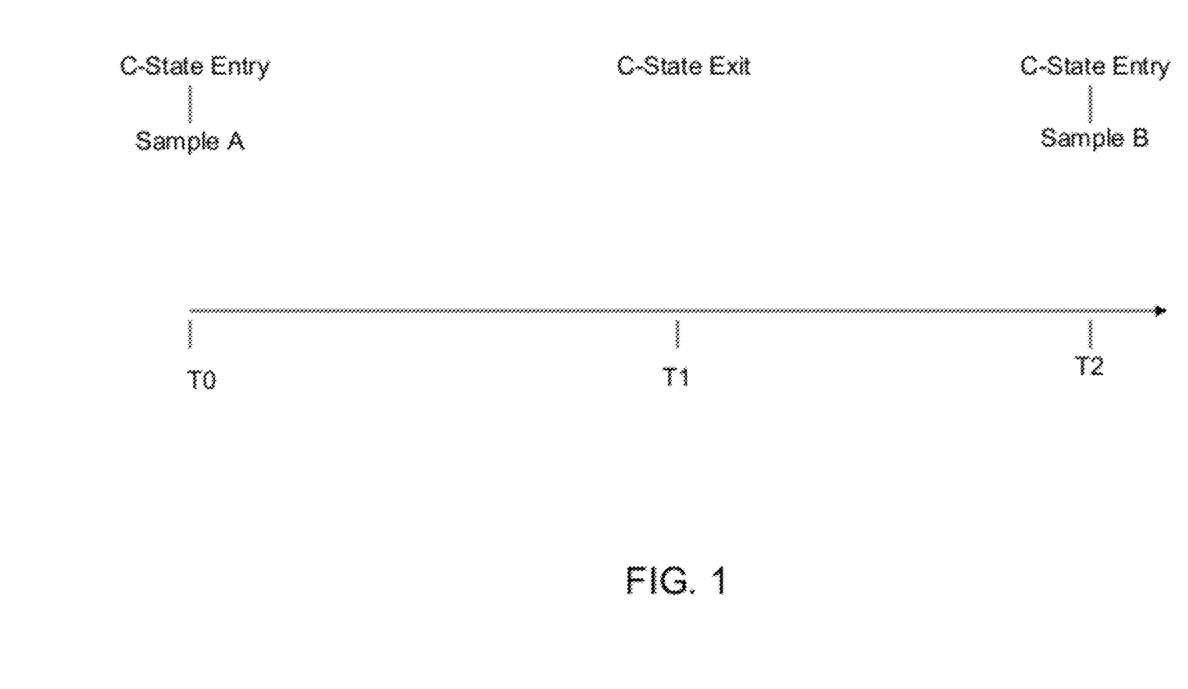
FIG. 1 illustrates a timing sequence in accordance with an embodiment of the present invention.

FIG. 1 illustrates a timing sequence in accordance with an embodiment of the present invention. At t0, the C-state entry tracepoint executes and sample A is collected. The processor then enters a sleep state. Note that the sleep state entered may be different than the state the operating system programmed. At t1, an event occurs that causes the hardware to exit its sleep state and return to normal operation and power consumption. The event that caused the sleep state to be exited (e.g., an interrupt or timer expiration) was not scheduled by the power profiler. At t2, the C-state entry tracepoint executes again and sample B is collected. Note that instead of being triggered by a tracepoint, data collection may occur responsive to another notification mechanism of an OS or a platform logic.

After the collection finishes, the collected data can be processed, e.g., by the profiling application. A difference is calculated between sample B's system clock value and sample A's system clock value, which may correspond to the actual time between two power state transition events. The difference between residency counts for sample A and sample B can also calculated to determine the low power state (and length or duration, which can in various embodiments be measured in cycles or time) for the first power state transition event.

For example, assume there are two residency counters—one for state C3 and one for state C6. Also, suppose at sample A and B the following values were collected as shown in Table 1.

TABLE 1

|  | Sample A | Sample B |
| --- | --- | --- |
| System Clock | 7,100,000 | 7,100,500 |
| C3 | 1,500,100 | 1,500,100 |
| C6 | 3,200,000 | 3,200,300 |

From this data, the power profiler can determine exactly which sleep state was entered (C6 in this case because the C3 counter did not change), how much time was spent operating in a sleep state (300 counts were spent at C6), and how much time was spent operating at normal power levels (200 counts–the total time minus the sleep time).

As discussed above, embodiments can be incorporated in various systems and using different components. In some embodiments, a method can be implemented as part of a set of performance analysis tools. More specifically, embodiments may be incorporated in a power profiler of such tool that can obtain information regarding power state transitions in a component of a system and process the data. This data may then enable analysis by a given entity such as a user, compiler, operating system or other such entity. The embodiments described herein are with regard to power transitions occurring in a processor such as a multi-core processor. However, while described with this particular implementation, understand the scope of the present invention is not limited in this regard and in other embodiments other components of a system such as chipsets, memory, peripheral devices or so forth can also benefit from power monitoring in accordance with an embodiment of the present invention.

Figure 2:
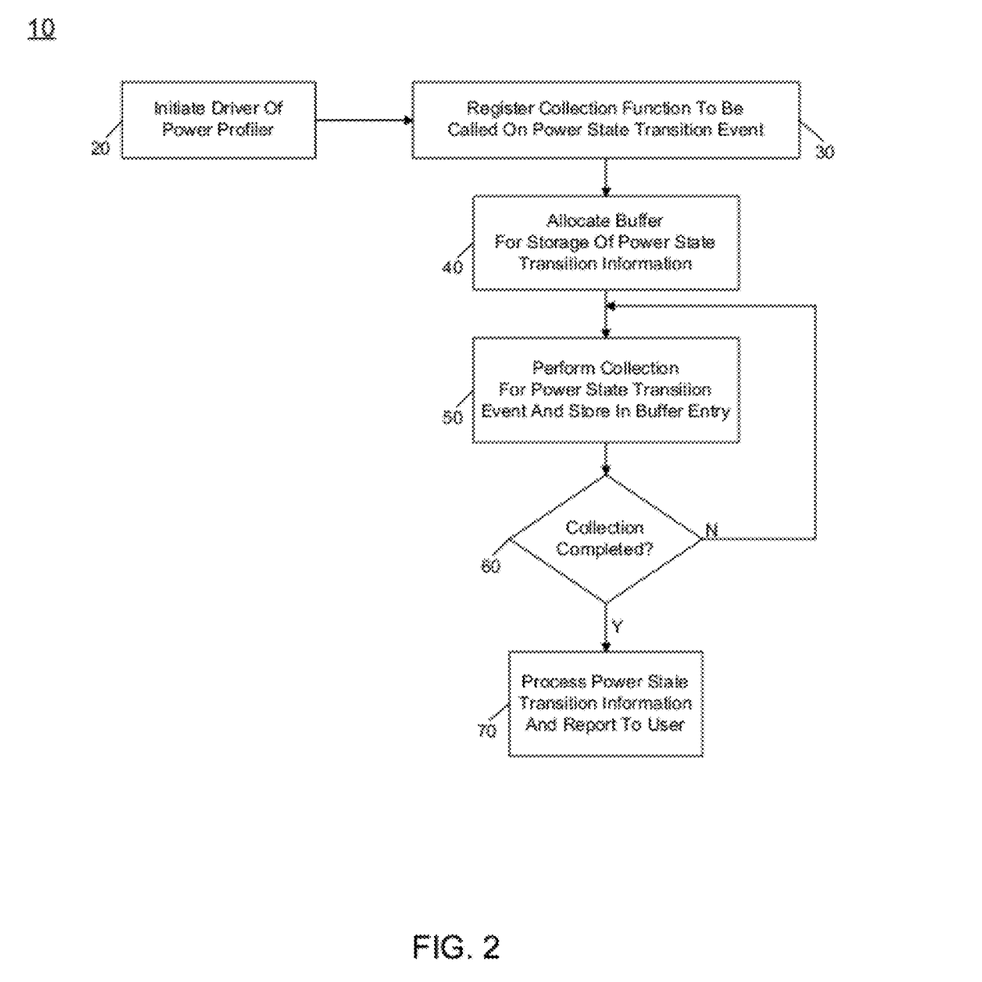
FIG. 2 is a flow diagram of an overall method for performing power profiling in accordance with an embodiment of the present invention.

Referring now to FIG. 2, shown is a flow diagram of an overall method for performing power profiling in accordance with an embodiment of the present invention. As shown in FIG. 2, method 10, which can be implemented in a performance analyzer, and more particularly in a power profiler of the analyzer, may begin by initializing a device driver of the power profiler (block 20). Such initialization of the device driver may enable low level functionality associated with the device driver such as the ability to access privileged resources such as various processor registers. Next, control passes to block 30 where a collection function, e.g., of this driver, may be registered to be called during a power state transition event. As one example, an OS module that handles power state transition events can be updated to register this collection function. In one particular embodiment for a Linux™ OS, this collection function can be registered with a tracepoint that handles instrumentation with regard to power transitions.

Still referring to FIG. 2, next a buffer may be allocated for storage of power state transition information that will be obtained during the collection function (block 40). As an example, this buffer may be set up in a cache memory of the processor, for example, a last level cache. Accordingly at this time, the power profiler is configured to perform collection operations to obtain power state transition information on occurrence of a power state transition event.

Accordingly, control passes to block 50 where a collection may be performed for a power state transition event, and the corresponding information obtained may be stored in the buffer. In various embodiments, the collection may be performed on a power state transition event corresponding to entry into a low power mode. This is so, as various operations are performed by the OS to prepare and enable the processor to enter into the low power mode. However, in other embodiments the information may instead be obtained on exit from the low power mode. In either event, note that information may be collected deterministically on every power state transition event (of a particular direction, i.e., into or out of a low power mode) during a profiling window, rather than at random times of system operation (e.g., according to an interrupt or timer) of a conventional power profiler. This collection can occur for many consecutive power state transition events (of a direction) for a time period corresponding to a profiling window, which in various embodiments can vary widely, e.g., collections can be as short as a second but will normally run as long as the workload driving the system (usually minutes but may be hours in rare cases).

Thus information from a plurality of consecutive power state transition events can be collected during a collection window. While the scope of the present invention is not limited in this regard, in various embodiments the information collected with regard to this transition event may include the value of various counters including a system level counter such as a timestamp counter, and the value of one or more counters associated with the different low power states available in a processor. For example, each C-state may have a machine specific register (MSR) associated with it that can be used for counting the duration of the given low power mode. After each collection, it may be determined whether collection has completed (diamond 60). For example, in various embodiments the power profiler may be configured to collect data for a predetermined amount of time or a predetermined number of power state events or so forth. If collection is not completed, control passes back to block 50.

Otherwise, control passes to block 70, where the power state transition information obtained from the collections can be processed and reported to a user. Note that while discussed at a relatively high level in the embodiment of FIG. 2, understand that various details and modifications are possible in different embodiments.

Figure 3:
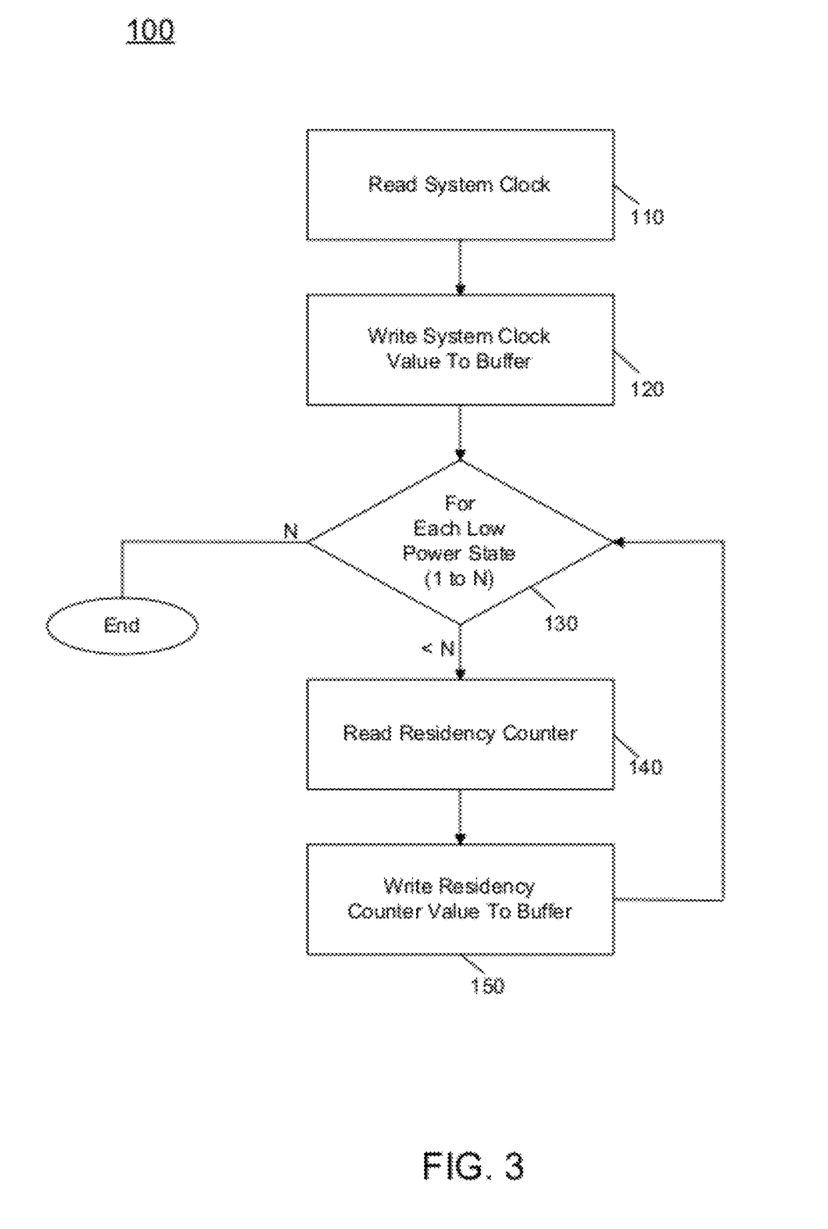
FIG. 3 is a flow diagram of a collection method in accordance with one embodiment of the present invention.

Referring now to FIG. 3, shown is a flow diagram of a collection method in accordance with one embodiment of the present invention. As discussed above, in some embodiments the collection method may be implemented via a function call to a driver that can access information present in privileged resources such as MSRs, system counters and so forth. However in other embodiments, understand that collections can occur in user mode. In FIG. 3, method 100 may begin by reading a system clock at block 110. In various embodiments, the system clock may correspond to a timestamp counter that is present on a core that is to be placed into a low power state. Thus understand that the collection operations can be performed at a core granularity, as a processor may be controlled to perform power management on a per core basis. However in other embodiments, a processor may only provide for package level power management and accordingly in such embodiments, information may be obtained at a package level. In yet other implementations combinations of core level and package level power state information can be obtained.

Still referring to FIG. 3, the system clock value that is read may be stored in the buffer (block 120). More specifically, for each collection, an entry of the buffer may be allocated and can be used to store this system clock value along with the values of a monotonic counter associated with each available low power state.

Thus it is further seen in FIG. 3 for each possible sleep state available in the processor (as determined at diamond 130), a loop is traversed that includes reading the corresponding residency counter for that low power state (block 140), which may be realized via reading a MSR for the low power state, and writing the counter value to the entry in the buffer (block 150). When all such counters have been read for available low power states, method 100 may conclude. Accordingly, the collection process for the power state transition event is completed and the information obtained stored in a buffer entry. Note that while described with this particular set of information in the embodiment of FIG. 3, understand the scope of the present invention is not limited in this regard, and in other embodiments additional or different information may be obtained. For example, in one embodiment this additional information may include the low power state requested by the OS (which may not be the low power state actually used by the hardware).

Figure 4:
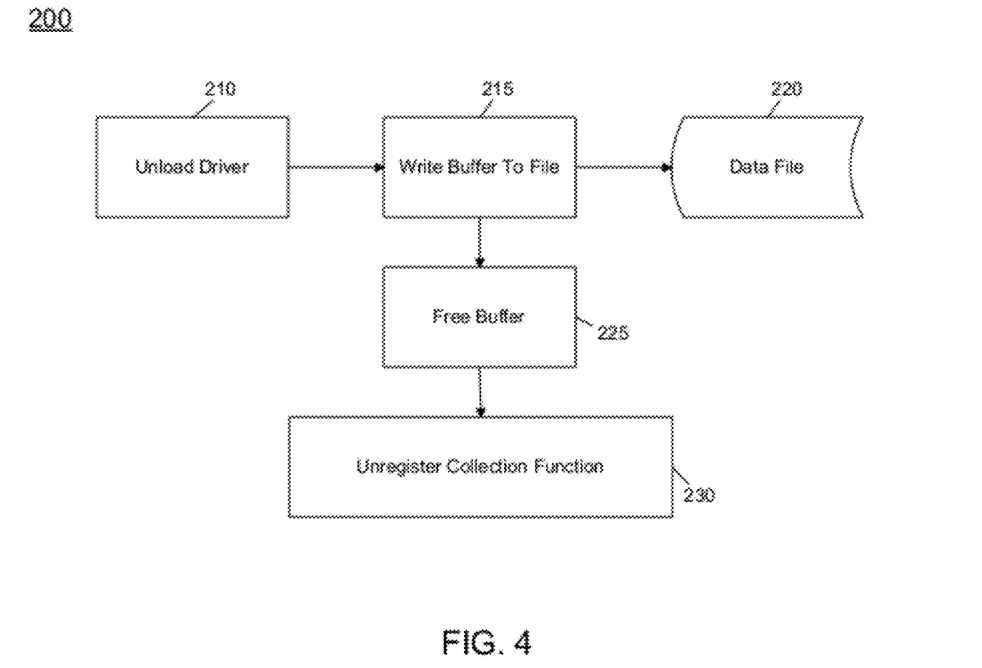
FIG. 4 is a flow diagram of a method for terminating data collection in accordance with an embodiment of the present invention.

A collection process such as described with regard to FIG. 3 may be performed numerous times. When the desired amount of data has been collected, the power profiler may perform various operations to ready the data for further processing, as well as to terminate the data collection. Referring now to FIG. 4, shown is a flow diagram of a method for terminating data collection in accordance with an embodiment of the present invention. As shown in FIG. 4 method 200 may perform various actions in the process of unloading a device driver (block 210). In general, the driver flushes the data (e.g., writes it to disk), frees the buffer, and unregisters the collection function before unloading. These steps (except unloading the driver) can occur after every collection. The driver can be manually inserted and removed (in a Linux™ OS) with the "insmod" or "rmmod" command or the driver can automatically be loaded at boot time and never removed. Finally, on some OS's, device drivers can be loaded and unloaded by specific user-mode system calls. In such implementations, the sequence can be to: (1) load the driver; (2) sometime later, run a collection; (3) repeat step 2, if desired; and (4) unload the driver. Also, note that in some implementations, the collected data can be returned to user-level code that controls the collections and is saved by the user-level code to a file. In other words, the driver does not actually write to a file, instead it passes the buffers to user-level code and the user-level code writes the data to a file during a collection. In a Linux™ OS, this type of device driver is called a 'character' driver.

As seen, the method begins at block 215 where the buffer may be written to a file. For example, the buffer, which as discussed above may be located in temporary storage in a cache of the processor, can be forwarded to a file system and may be stored, for example, in a system memory as a data file 220 for later access. Next, control passes to block 225 where the buffer may be freed such that it is returned to the OS's pool of resources. Finally, control passes to block 230, where the collection function may be unregistered. That is, the OS tracepoint or other kernel (or other location) at which the collection function was registered can be unregistered such that the function is no longer called during a power state transition event. At this point, the device driver may be unloaded.

Figure 5:
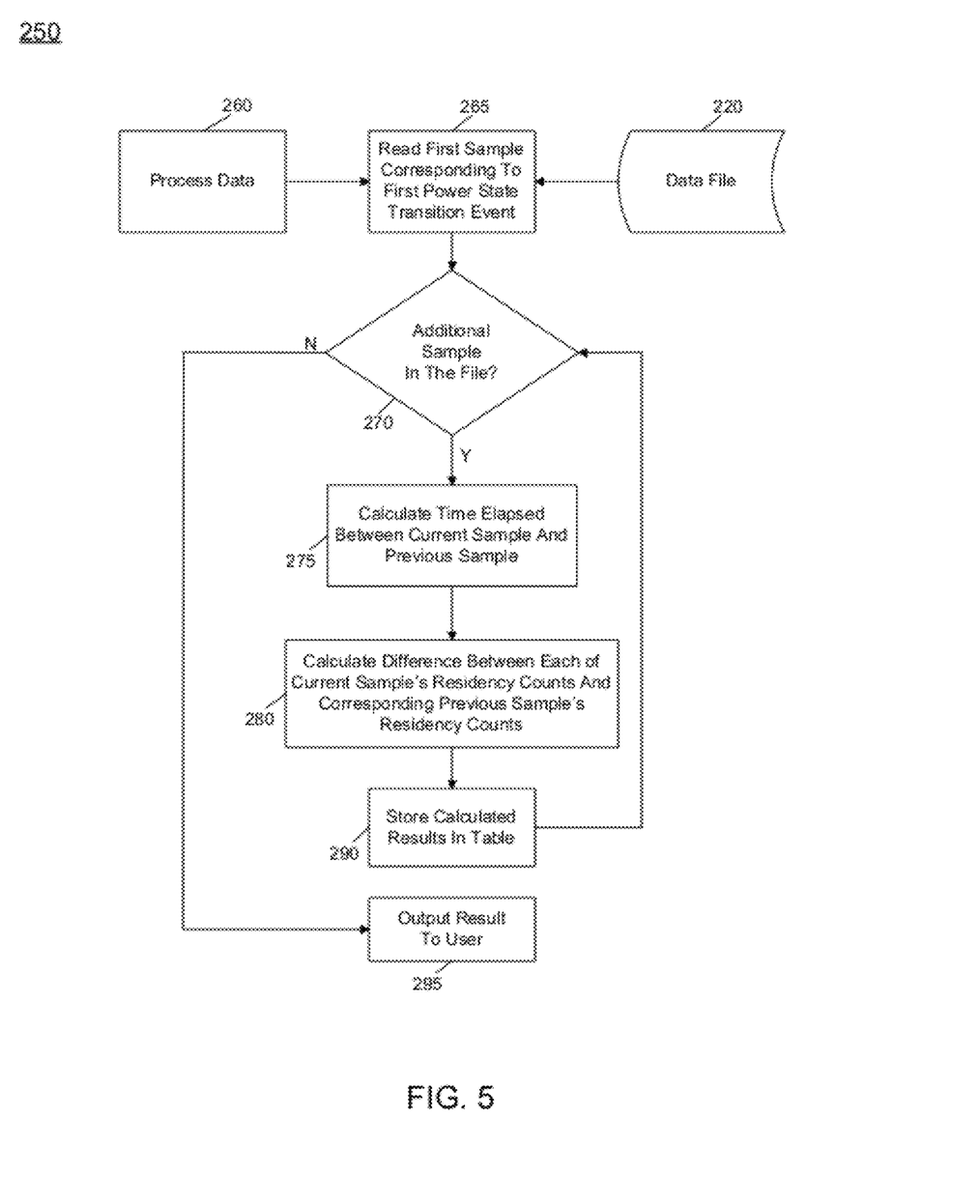
FIG. 5 is a flow diagram of a method for processing collected data in accordance with an embodiment of the present invention.

Thus at this time, desired power state information has been obtained and can be further processed to enable its analysis by a user or other entity such as an analysis tool of a system. Referring now to FIG. 5, shown is a flow diagram of a method for processing collected data in accordance with an embodiment of the present invention. As shown in FIG. 5, method 250 may begin by processing data file 220 (block 260). In one embodiment, this processing may include associating the data with a description of what caused the processor to transition back to an active state (e.g., a timer or an interrupt or even a description of the source code call stack that led to the event that caused the transition back to an active state). At this time the data is thus in a format to be handled, e.g., by a utility of the power profiler.

Referring still to FIG. 5, control passes to block 265 where a first sample corresponding to a collection for a first power state transition event may be read from the data file. Then a loop may be performed for each additional sample in the file, as determined at diamond 270. Specifically in this loop, at block 275 an elapsed time can be calculated between a current sample and previous sample (block 275). In addition, at block 280, a difference between each of the current sample's residency counts and the previous sample's residency counts may be calculated. At block 290, the calculated results may be stored in a table. Thus for each pair of adjacent samples, the elapsed time (as determined by a difference in the number of system clocks) between a previous entry into a low power state and a current entry into a low power state can be determined. Furthermore, based on the difference between the corresponding residency counts, the given low power state that was entered in the prior transition to low power can be determined as well as a determination of the duration of the time in the low power state. Thus for each pair of samples, the elapsed time between the two power state events can be determined as well as the duration and type of the previous low power entry. Thus these values, along with the differences of the other residency counters (which may all be equal to zero) may be stored in an entry of the table. This loop thus proceeds for each additional sample in the data file.

At the conclusion of this processing, control passes to block 295 where the result may be output to a user. For example, the output could take the form of a timeline describing the activity during a collection or could also be displayed as a histogram describing how often a state was utilized, etc. As some examples, the output may be a printout or a user-visible display on a display of the platform. Still further, the results stored in the table may also be made available in machine-readable form for use by other analysis and control tools such as a compiler, OS, or other tool. As one example, the information in the table may be provided in a human-readable form and/or a computer-readable form to an OS entity. This information may be used by OS developers and/or an operating OS itself to improve performance with regard to power management decisions. For example, a developer may update power management code of the OS based on the received information.

As one such example (as discussed above), it is possible that processor hardware may choose to enter a different low power state than that requested by the OS. Based on the information available in the table, namely a duration and type of a particular low power state entered at a given interval, the OS entity can determine that its request to enter a low power state was not accepted in favor of the processor selection of a different low power state. Based on this information, the OS entity may modify its power management algorithms and/or heuristics to make different power management decisions, e.g., in a future OS release. Furthermore, in an embodiment in which such information is provided in computer-readable form to a current OS instantiation executing on the platform, the OS instantiation may in real time update its control algorithms and in further executions make better decisions based on such information. While shown with this particular implementation in the embodiment of FIG. 5, understand the scope of the present invention is not limited in this regard.

Figure 6:
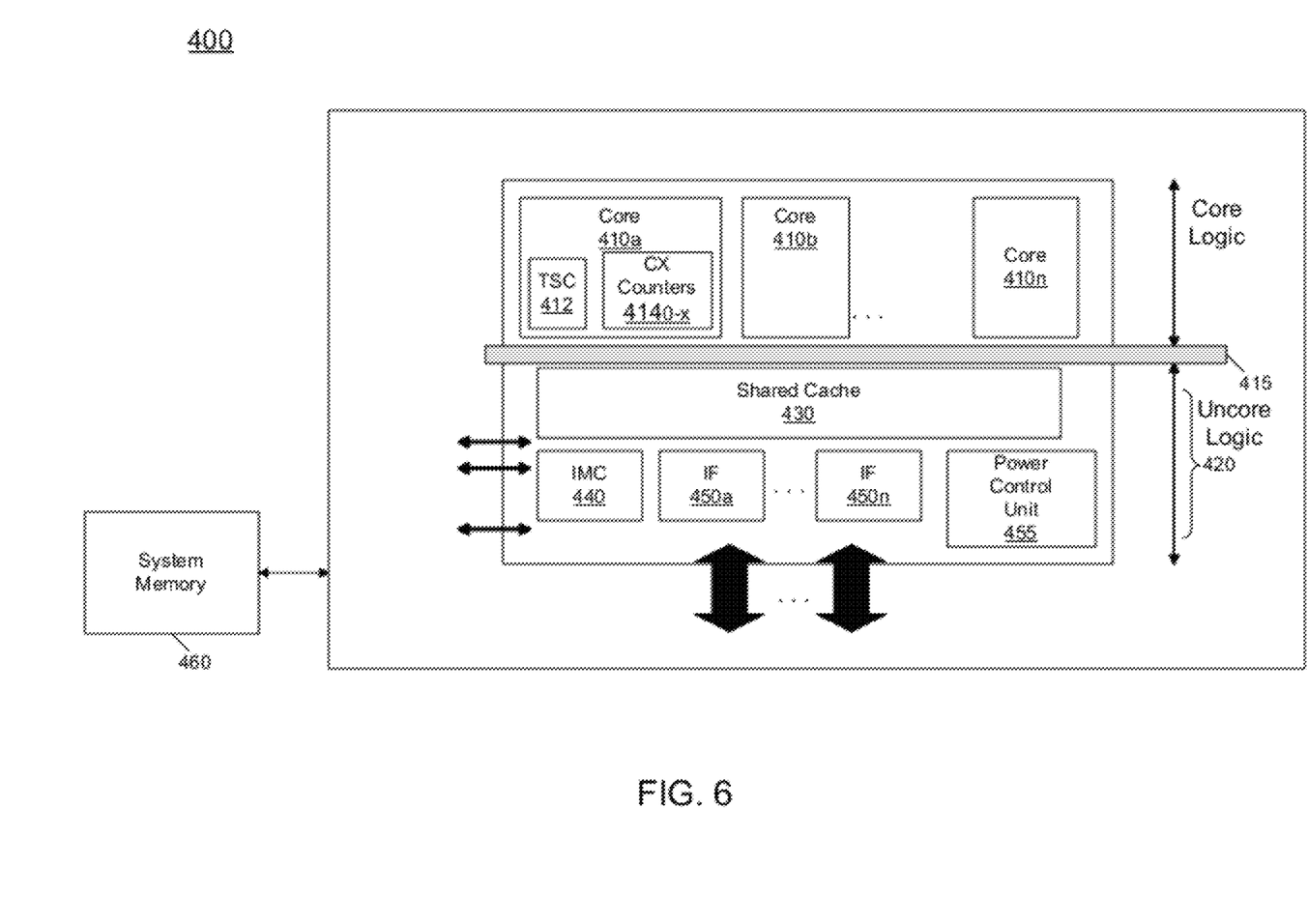
FIG. 6 is a block diagram of a processor in accordance with an embodiment of the present invention.

Referring now to FIG. 6, shown is a block diagram of a processor in accordance with an embodiment of the present invention. As shown in FIG. 6, processor 400 may be a multicore processor including a plurality of cores $410_a$-$410_n$. In one embodiment, each such core may include a pipeline with, e.g., front end units, out-of-order logic, execution units, and backend units such as retirement logic. In addition as described above each core may include various counters which can be implemented as registers such as machine specific registers, performance monitors, or so forth. In the embodiment of FIG. 6, these counters include a time stamp counter 412. Counter 412 may be configured to count at a nominal frequency of the processor, e.g., as machine cycles, and in some embodiments may count continuously, regardless of a power state of the core (or processor, so long as power is provided to the processor) and a plurality of low power counters $414_{0-x}$, with each such counter to count cycles in which the core is in a given low power state.

The various cores may be coupled via an interconnect 415 to an uncore 420 that includes various components. As seen, the uncore 420 may include a shared cache 430 which may be a last level cache. In addition, the uncore may include an integrated memory controller 440, various interfaces 450 and a power control unit 455, which may be used, in some embodiments to enter and exit from low power states independently of the OS. As seen, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 6, the scope of the present invention is not limited in this regard.

Figure 7:
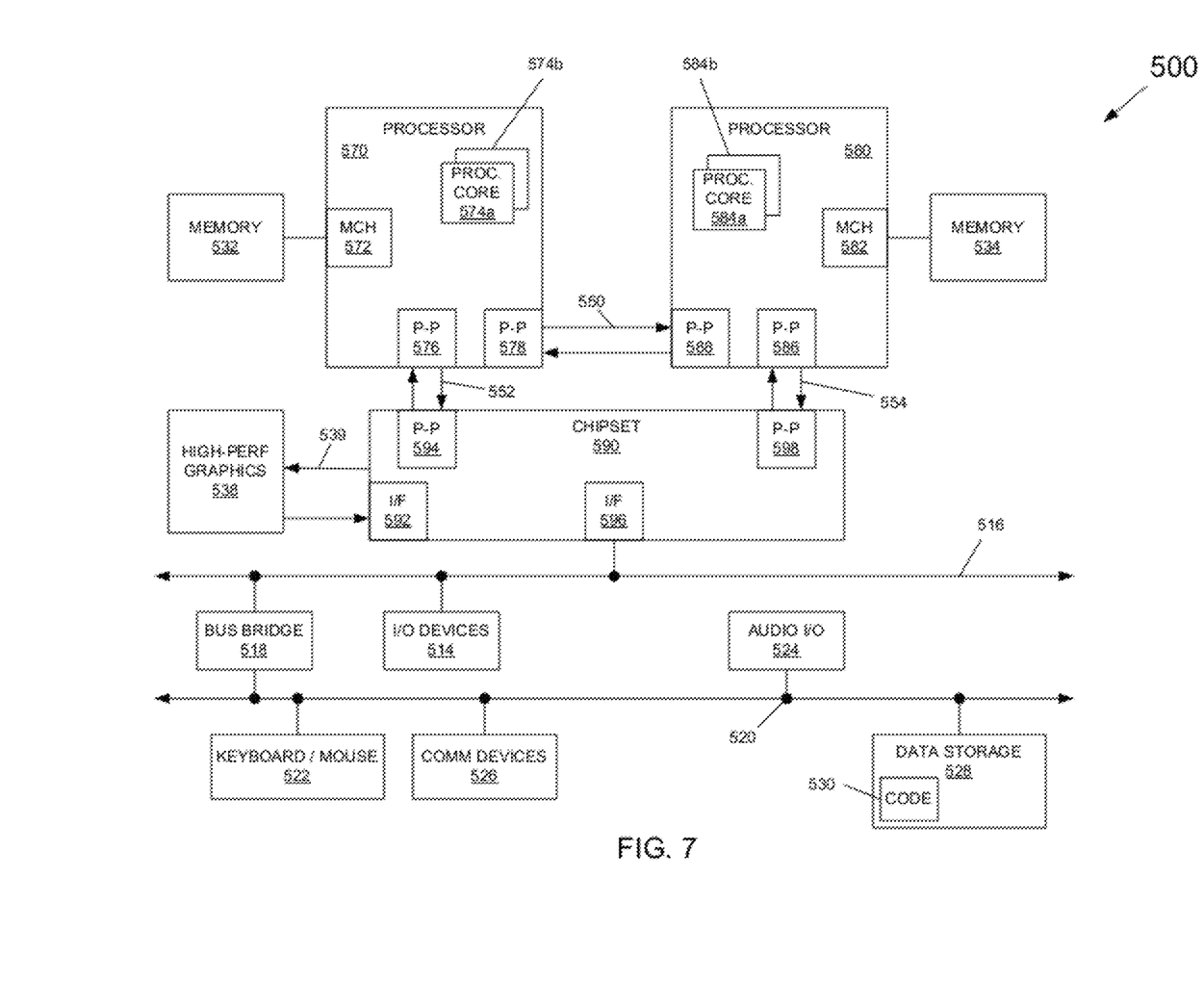
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 500 is a point-to-point interconnect system, and includes a first processor 570 and a second processor 580 coupled via a point-to-point interconnect 550. As shown in FIG. 7, each of processors 570 and 580 may be multicore processors, including first and second processor cores (i.e., processor cores 574a and 574b and processor cores 584a and 584b), although potentially many more cores may be present in the processors. Each of the cores may include various residency and system counters as described above.

Still referring to FIG. 7, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 7, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 7, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 7, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, e.g., to perform power profiling in accordance with an embodiment of the present invention. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of non-transitory storage medium such as a disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   registering a function of a device driver of a power profiler with an operating system (OS), the power profiler to be called when a power state transition event occurs in a processor of a system;
   allocating a buffer to store information related to the power state transition event; and
   on occurrence of the power state transition event as a trigger event for the power profiler, calling the function to:
     read a system counter value and a counter value of the processor for each of one or more low power states of the processor; and
     write the system counter value and the one or more counter values into the buffer to deterministically collect information during a profiling window, wherein the power profiler does not schedule an event to collect the information, such that the system counter value and the plurality of counter values are read without occurrence of an interrupt or a timer expiration.

2. The method of claim 1, further comprising passing control from the OS to a collection function of the device driver of the power profiler to read the system counter value and the plurality of counter values.

3. The method of claim 2, further comprising inserting a call to the collection function in a tracepoint of the OS.

4. The method of claim 1, further comprising reading the system counter value and the plurality of counter values for each of a plurality of power state transition events, and for each of the power state transition events, writing the system counter value and the plurality of counter values to the buffer.

5. The method of claim 4, further comprising determining an elapsed time between a first and second power state transition event based on the system counter value read at the first and second power state transition events and determining a duration and type of a low power state entered after the first power state transition event based on the plurality of counter values read at the first and second power state transition events.

6. The method of claim 5, further comprising determining a difference between the system counter value read at the first and second power state transition events.

7. The method of claim 5, further comprising providing information including the duration and low power state type to the OS that requested the first power state transition event.

8. The method of claim 7, further comprising modifying a behavior of the operating system, wherein the operating system requested that the first power state transition event be of a different type, the component overriding the request to a different low power state corresponding to the low power state type.

9. The method of claim 5, further comprising recording the elapsed time, the duration and the low power state type in a table.

10. An article comprising a non-transitory machine-accessible storage medium including instructions that when executed cause a system to:
    upon occurrence of each of a plurality of power state transition events of a first direction for a core of a multi-core processor and without scheduling an event for collection of information, call a function of a power profiler from a notification mechanism of an operating system to:
      read a value of a system counter of the core and values of each of a plurality of low power counters of the core to collect the information, without expiration of a timer or triggering of an interrupt that would cause the core to exit a low power state; and
      store the system counter value and the plurality of low power counter values in a storage of the multi-core processor; and
    after the plurality of power state transition events, access the storage to determine a power profile of the multi-core processor using the stored system counter values and the stored plurality of low power counter values.

11. The article of claim 10, further comprising instructions that when executed enable the system to determine an elapsed time between a first and second power state transition event based on the system counter value read at the first and second power state transition events and determine a duration and type of a low power state entered after the first power state transition event based on the plurality of low power counter values read at the first and second power state transition events.

12. The article of claim 11, further comprising instructions that when executed enable the system to record the elapsed time, the duration and the low power state type in a table, and provide information including the duration and low power state type to the operating system.

13. The article of claim 12, further comprising instructions that when executed enable the system to call the function when each of the plurality of power state transition events occurs to read the system counter value and the plurality of low power counter values.

14. The article of claim 10, further comprising instructions that when executed enable the system to allocate a buffer to store the system counter values and the plurality of low power counter values.

15. The article of claim 10, further comprising instructions that when executed enable the system to pass control from the operating system to a collection function of a device driver of the power profiler to read the system counter value and the plurality of low power counter values.

16. A system comprising:
a multi-core processor including a plurality of cores, each core of the plurality of cores including:
   a front end logic;
   an out-of-order logic;
   a backend logic;
   a time stamp counter to store a count of cycles; and
   a plurality of low power state counters, each of the plurality of low power state counters to count the cycles in which the core is in the corresponding low power state; and
a power profiler having a device driver including a function, responsive to notification to the power profiler of a power state transition event, to:
   read the time stamp counter and the plurality of low power state counters for each of one or more low power states of the multi-core processor, without scheduling an event for collection of information that would cause the core to exit a low power state; and
   write the time stamp counter value and the plurality of low power state counter values into a buffer.

17. The system of claim 16, wherein the power profiler is to read the time stamp counter and the plurality of low power state counters for a consecutive number of power state transition events of a first direction.

18. The system of claim 17, wherein the power profiler is to read the time stamp counter and the plurality of low power state counters without expiration of a timer or triggering of an interrupt.

19. The system of claim 16, wherein the power profiler includes a collection function that is called by a notification mechanism of an operating system with which the power profiler is registered, the notification mechanism to execute during a power state transition event into each of the one or more low power states.

* * * * *